US012439196B2

(12) United States Patent
Chang et al.

(10) Patent No.: US 12,439,196 B2
(45) Date of Patent: Oct. 7, 2025

(54) INFORMATION HANDLING SYSTEM HEADPHONE HAVING FLEXIBLE HEADSET MICROPHONE BOOM

(71) Applicant: Dell Products L.P., Round Rock, TX (US)

(72) Inventors: Chia-Yuan Chang, New Taipei (TW); You-Yu Lin, New Taipei (TW); Sok Hui Khoo, Singapore (SG)

(73) Assignee: Dell Products L.P., Round Rock, TX (US)

( * ) Notice: Subject to any disclaimer, the term of this patent is extended or adjusted under 35 U.S.C. 154(b) by 339 days.

(21) Appl. No.: 18/172,468

(22) Filed: Feb. 22, 2023

(65) Prior Publication Data

US 2024/0284088 A1 Aug. 22, 2024

(51) Int. Cl.
*H04R 25/00* (2006.01)
*H04R 1/10* (2006.01)

(52) U.S. Cl.
CPC ......... *H04R 1/1066* (2013.01); *H04R 1/1008* (2013.01); *H04R 2201/107* (2013.01)

(58) Field of Classification Search
CPC ................ H04R 1/1008; H04R 1/1066; H04R 2201/107; H04R 1/1041
USPC .......................................................... 381/374
See application file for complete search history.

(56) References Cited

U.S. PATENT DOCUMENTS

| | | | | |
|---|---|---|---|---|
| 7,120,267 | B2 | 10/2006 | Ito et al. | |
| 7,620,433 | B2 * | 11/2009 | Bodley | H04M 1/6066 455/575.2 |
| 7,627,352 | B2 | 12/2009 | Gauger et al. | |
| 8,983,552 | B2 | 3/2015 | Andersen et al. | |
| 9,973,854 | B1 | 5/2018 | Zimmer | |
| 2005/0105740 | A1 * | 5/2005 | Dyer | B60R 11/0241 381/16 |
| 2012/0207320 | A1 | 8/2012 | Avital | |
| 2019/0273978 | A1 | 9/2019 | Kulavik et al. | |

* cited by examiner

*Primary Examiner* — Phylesha Dabney
(74) *Attorney, Agent, or Firm* — Zagorin Cave LLP; Robert W. Holland

(57) ABSTRACT

An information handling system headset has an earcup that rotationally couples a microphone boom at one end of a cavity to rotate between an extended position with a member of the microphone boom in straight form and a retracted position with the member bent to fit in the cavity and substantially conform with the earcup periphery. The microphone boom member rotates between first and second stops disposed proximate the hinge and bend when pushed against the first stop to fit in the cavity. The microphone boom can fully insert into the cavity to have a flush outer periphery at the earcup or can partially extend out of the cavity at the terminating end where the microphone couples to the member.

20 Claims, 15 Drawing Sheets

INFORMATION HANDLING SYSTEM HEADPHONE HAVING FLEXIBLE HEADSET MICROPHONE BOOM

BACKGROUND OF THE INVENTION

Field of the Invention

The present invention relates in general to the field of information handling system input/output devices, and more particularly to an information handling system headphone having flexible headset microphone boom.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems process information with processing components disposed in a housing and interact with end users through input/output (I/O) devices, such as a display, keyboard, mouse, speakers and a microphone. Stationary information handling systems typically operate in fixed location, such as a desktop, and interact with end users through peripheral I/O devices, such as a peripheral display, keyboard and mouse. Portable information handling systems allow end users to carry a system between meetings, during travel, and between home and office locations so that an end user has access to processing capabilities while mobile. To support end user interactions, portable information handling systems typically integrate a display and keyboard in a portable housing with a battery power source. In addition, portable information handling systems generally can interact with peripheral I/O devices when available, such as through a docking station at a desktop location.

One common function of information handling systems is to support communications through videoconferences and audioconferences. Often peripheral displays will have a peripheral camera coupled along a perimeter to capture video and audio of an end user for a video conference that is presented through the display. The audio is presented at speakers included in the display and/or peripheral speakers that interface with the information handling system. Portable information handling systems typically integrate a camera, microphone and speakers in the portable housing that can support a video conference when an end user is mobile. A difficulty that arises with integrated speakers and microphones is that the audio interactions can be heard by those around an end user. To achieve greater privacy, end users will often resort to a headset having earcups to play audio and microphone boom to capture end user speech. The earcups fit over the ears of the end user so that audible sounds played from the information handling system are not heard by others located nearby. The microphone boom lowers to the end user's mouth so that normal speech from the end user is captured and the end user does not have to speak more loudly towards a microphone on the information handling system. When the end user is only listening to audible sounds, the microphone boom will sometimes rotate backwards and out of the way.

One difficulty with the use of a microphone boom is that the boom typically extends out from one of the earcups and can interfere with the end user when not in use. For example, end user's will often wear a headset to just play audio without wanting to capture speech, such as to listen to music or to audio of a movie. Although the microphone boom may rotate to a rearward position, it can still interfere with hair and clothes and can detract from an end user's appearance. In addition, when the end user wears the headset and listens to audio, the end user does not have any visual confirmation that the microphone boom is muted when the microphone boom is rotated rearwards and out of sight.

SUMMARY OF THE INVENTION

Therefore, a need has arisen for a system and method which extends and retracts a microphone boom at a headset.

In accordance with the present invention, a system and method are provided which substantially reduce the disadvantages and problems associated with previous methods and systems for configuring a headset microphone boom to extend and retract. A microphone boom retracts into a cavity of an earcup with a bent form of a flexible member working against a stop so that, when released from the cavity, the flexible member biases to a straight form and an extended position having a microphone positioned to capture audible sounds.

More specifically, an information handling system includes a processor and memory that cooperate to process information, such as audible information presented at a speaker and captured by a microphone. A headset interfaces with the processor to communicate the audible information, such as by playing audible information at a speaker in each of plural earcups and providing the processor with audible information captured by a microphone. The microphone is coupled at a terminating end of a microphone boom having a flexible member that holds the microphone proximate an end user's mouth in an extended position and retracts within a cavity of an earcup by bending to conform to the earcup periphery shape. The microphone boom extends about a hinge having a rotation range defined by forward and rearward stops to allow the end user to adjust the microphone position when the flexible member has a straight form. In response to an inward rotation force, the flexible member bends about the forward stop to conform to the earcup outer periphery and is held in the retracted position by opposing polarity magnets.

The present invention provides a number of important technical advantages. One example of an important technical advantage is that a microphone boom maintains a clean appearance when not in use by an end user and readily extends when capture of audible sounds is desired. The flexible member extends with a straight form to aid in shortening the boom length yet wraps in a bent form into a cavity of the earcup for aesthetically pleasing flush appearance across most of the microphone boom length. When released from the retracted position, the microphone boom flips out to a normal position to capture audio without adjustments by an end user. The bending microphone boom helps to reduce the earcup size by using less cavity room when in the retracted position. The microphone can partially extend out of the cavity to aid an end user grasp or completely insert into the cavity flush with the earcup periphery.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system headset includes a microphone boom that extends and retracts within a cavity of an earcup. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
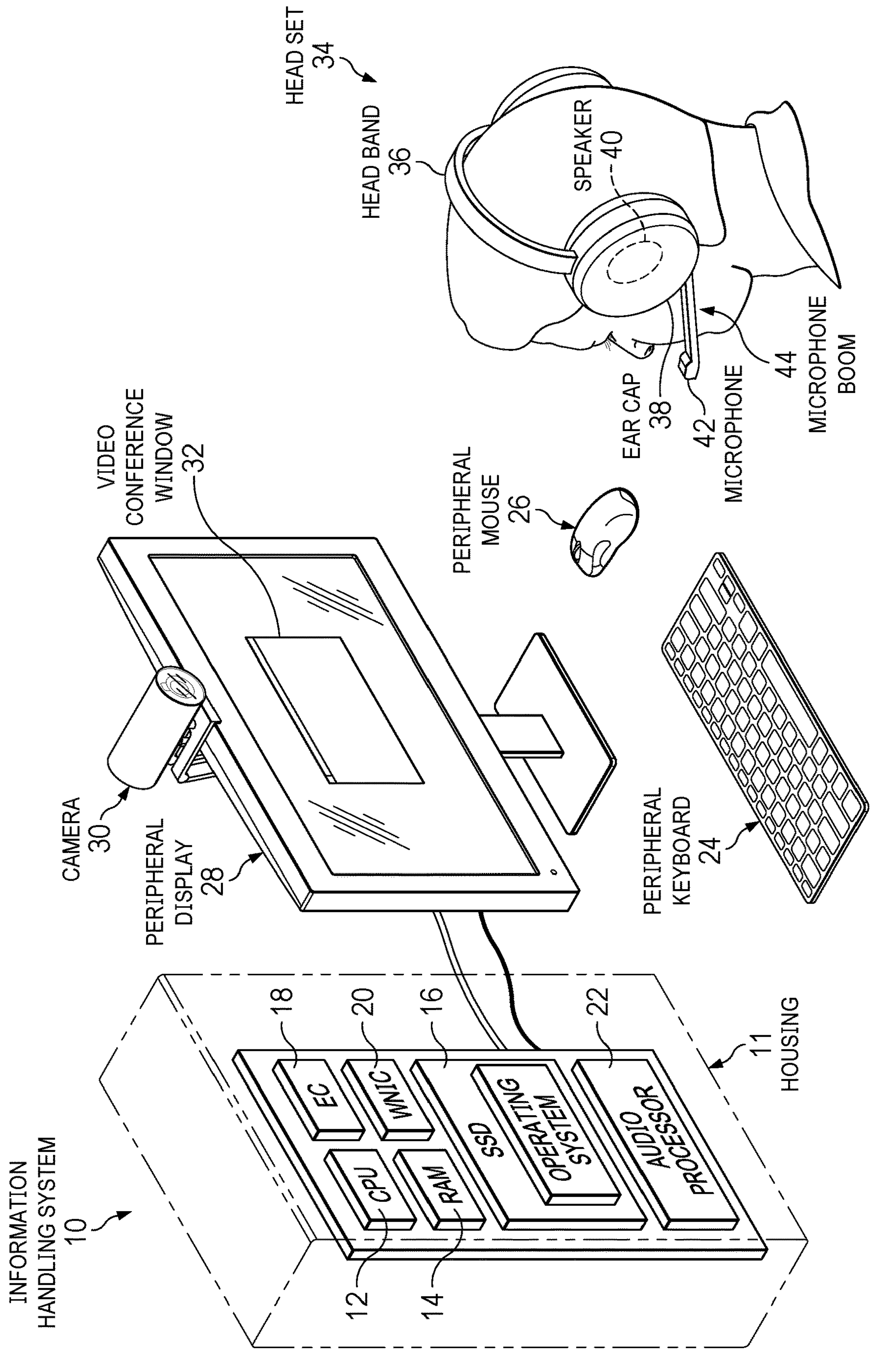
FIG. 1 depicts a block diagram of an information handling system that interacts with a headset having a retractable microphone boom.

Referring now to FIG. 1, a block diagram depicts an information handling system 10 that interacts with a headset 34 having a retractable microphone boom 44. Information handling system 10 processes information with processing components disposed in a housing 11. A central processing unit (CPU) 12 executes instructions to process information in cooperation with a random access memory (RAM) 14 that stores the instructions and information. A solid state drive (SSD) 16 has persistent storage, such as flash memory, that stores information during power down, such as an operating system that executes on CPU 12 to coordinate execution of applications. An embedded controller 18 includes non-transitory memory and embedded code that executes to manage system operational constraints, such as application of power, thermal conditions and interactions with peripheral devices. A wireless network interface controller (WNIC) 20 supports wireless communication with external devices, such as through wireless local area networks (WLAN) like WiFi and wireless personal area networks (WPAN) like BLUETOOTH. An audio processor supports interactions with CPU 12 for audio information, such as playing audio or communicating audio captured locally by a microphone through a network interface. As an example, an audio driver in the operating system coordinates through embedded controller 18 to play audio at a peripheral speaker, such as headset 34 as described in greater detail below. The example embodiment accepts end user inputs through a peripheral keyboard 24 and a peripheral mouse 26, and presents visual images as output at a peripheral display 28.

In operation, information handling system 10 of the example embodiment executes a videoconference application to present a videoconference in a videoconference window 32 of a peripheral display 28. For instance, the videoconference includes video captured by a camera 30 for local presentation and communication through a network to other participants. The videoconference has audiovisual presentation with synchronized video and audio. In the example embodiment, audio is presented and captured with a headset 34 that includes speakers 40 and a microphone 42. Headset 34 has an earcup 38 that fits over each ear of an end user and is held in place by a head band 36. Each earcup 38 holds a speaker 40 that presents audio information as audible sounds that the end user hears. A microphone boom 44 rotationally couples to one of the earcups 38 to rotate between a retracted position that hides microphone 42 and an extended position that aligns microphone 42 with the end user mouth. Microphone 42 captures audio sounds and translates the captured sound to signals that are communicated to audio processor 22, such as through a WPAN. When the end user does not desire to capture audio with microphone 42, microphone boom 44 is rotated into a cavity of earcup 38 to keep microphone 42 out of the end user's way.

Figure 2:
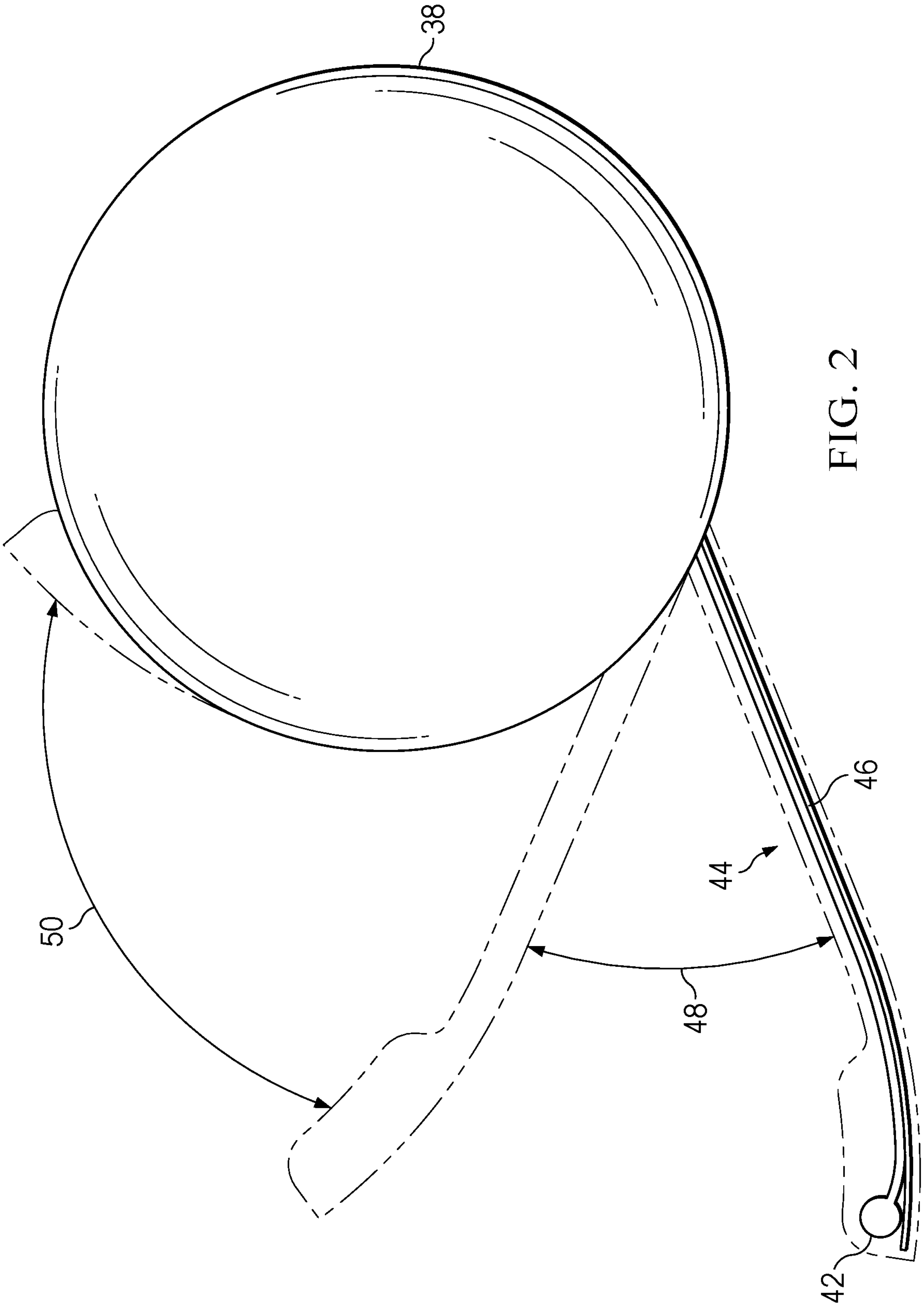
FIG. 2 depicts a side view of a headset earcup having a retractable microphone boom with a range of motion.

Referring now to FIG. 2, a side view depicts a headset earcup 38 having a retractable microphone boom 44 with a range of motion. Microphone boom 44 has a flexible member 46 that rotates at a hinge located at a periphery of earcup 38 on one end of a cavity in which microphone boom 44 retracts. In a free rotation zone 48, member 46 rotates about the hinge so that microphone boom 44 has a straight form in a central portion without experiencing any bending stress. In the example embodiment, free rotation zone 48 is approximately 30 degrees and represents a normal range for distance that an end user might want to select to place microphone 42 at a distance to the end user mouth. In a bending zone 50, rotation of member 46 is stopped so that force applied towards a retracted position results in bending of member 46 to conform with the outer periphery of earcup 38. In a retracted position, microphone 42 at least partially enters a cavity within earcup 38. The example embodiment depicts microphone 42 at the end of microphone boom 44 extending slightly out of earcup 38 when fully retracted so that microphone boom 44 is out of the end user way yet available to accept a finger pull. In an alternative embodiment described in greater detail below, microphone boom 44 fully inserts into the cavity to conform with the periphery of earcup 38 along the entire length of microphone boom 44. In the example embodiment, bending zone 50 has approximately 60 degrees of rotation. In various embodiments, the amount of free rotation and bending zone rotation are selected to provide an end user with a desired adjustment range for distance of the microphone to the end user mouth and to provide a bending curvature that conforms to the shape of member 46 to the shape of the periphery of earcup 38.

Figure 3:
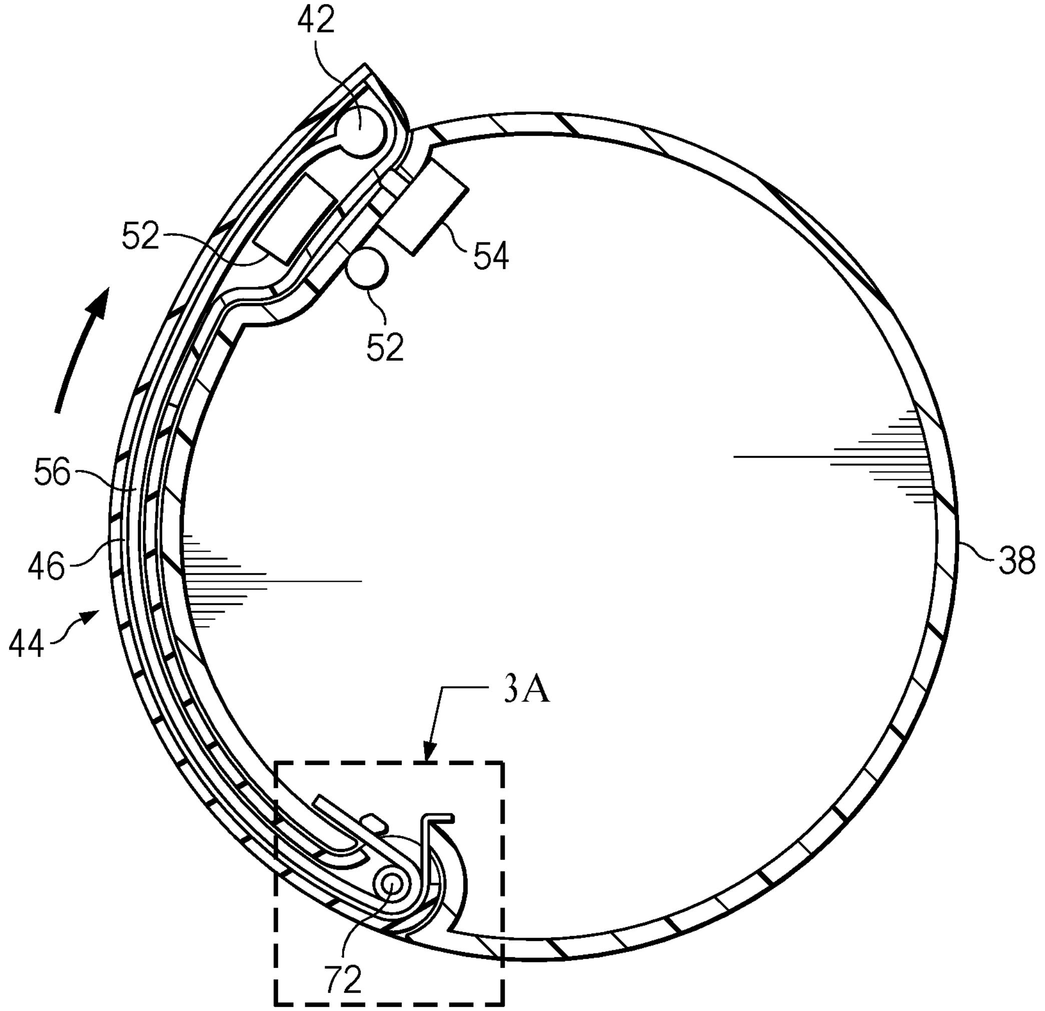
FIGS. 3 and 3A depict a side sectional view of the headset earcup having the microphone boom in a retracted position.
Figure 3A:
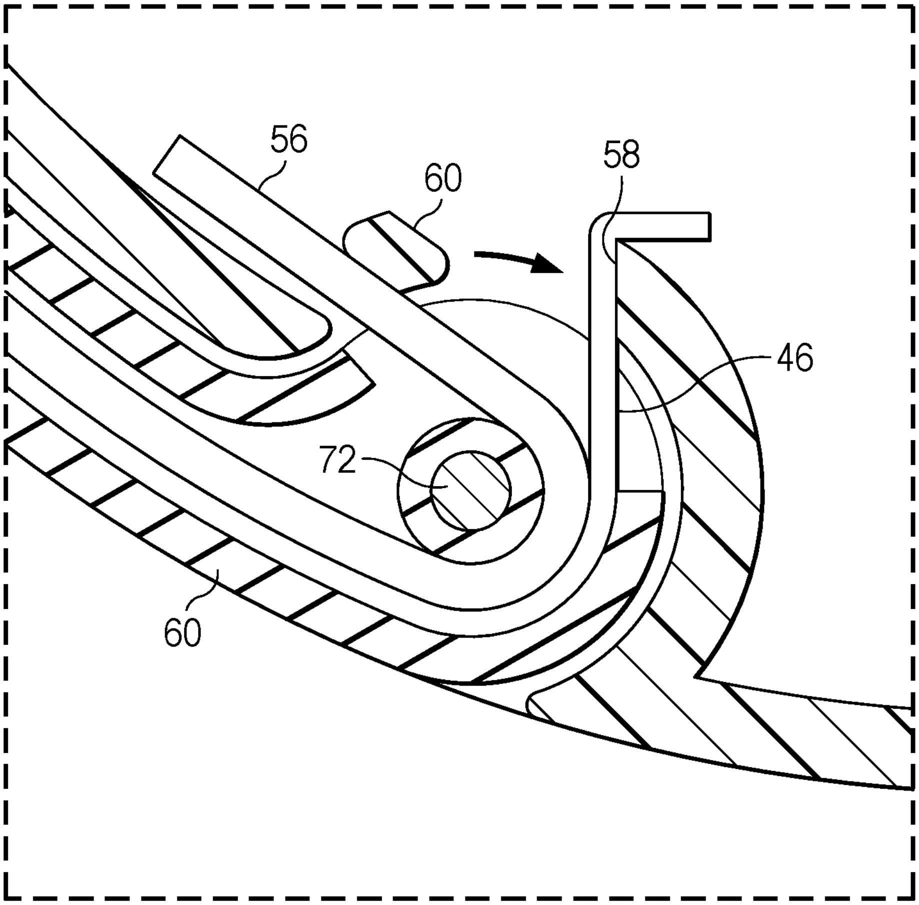

Referring now to FIGS. 3 and 3A, a side sectional view depicts the headset earcup 38 having the microphone boom 44 in a retracted position. A pair of magnets 52 having opposing polarity provide a retention force to hold microphone 42 partially within the cavity of earcup 38 in the retracted position. A microphone detector switch 54 is pressed by the microphone end of microphone boom 44 to provide a retracted signal that mutes microphone 42, such as by cutting power to microphone 42. Microphone boom 44 with member 46 bends to conform with the periphery of earcup 38. A cable 56 provides signal communication through microphone boom 44 to microphone 42 and a rubber casing 60 encloses member 44 and cable 56. Member 46 rotates about a hinge 72 to extend and retract microphone boom 44. FIG. 3A depicts a rearward stop 58 and a forwards step 60 that define the rotation zone of member 46 when microphone boom 44 is extended. In the example embodiment, the retracted position works member 46 against rearward stop 58 to stop rotation about hinge 72 and bend member 46 to achieve the conforming shape on the periphery of earcup 38. When microphone boom 44 is pulled free from the magnetic retaining force of magnets 52, member 46 provides a spring force that rotates microphone boom 44 through the bending zone and to the free rotation zone.

Figure 4:
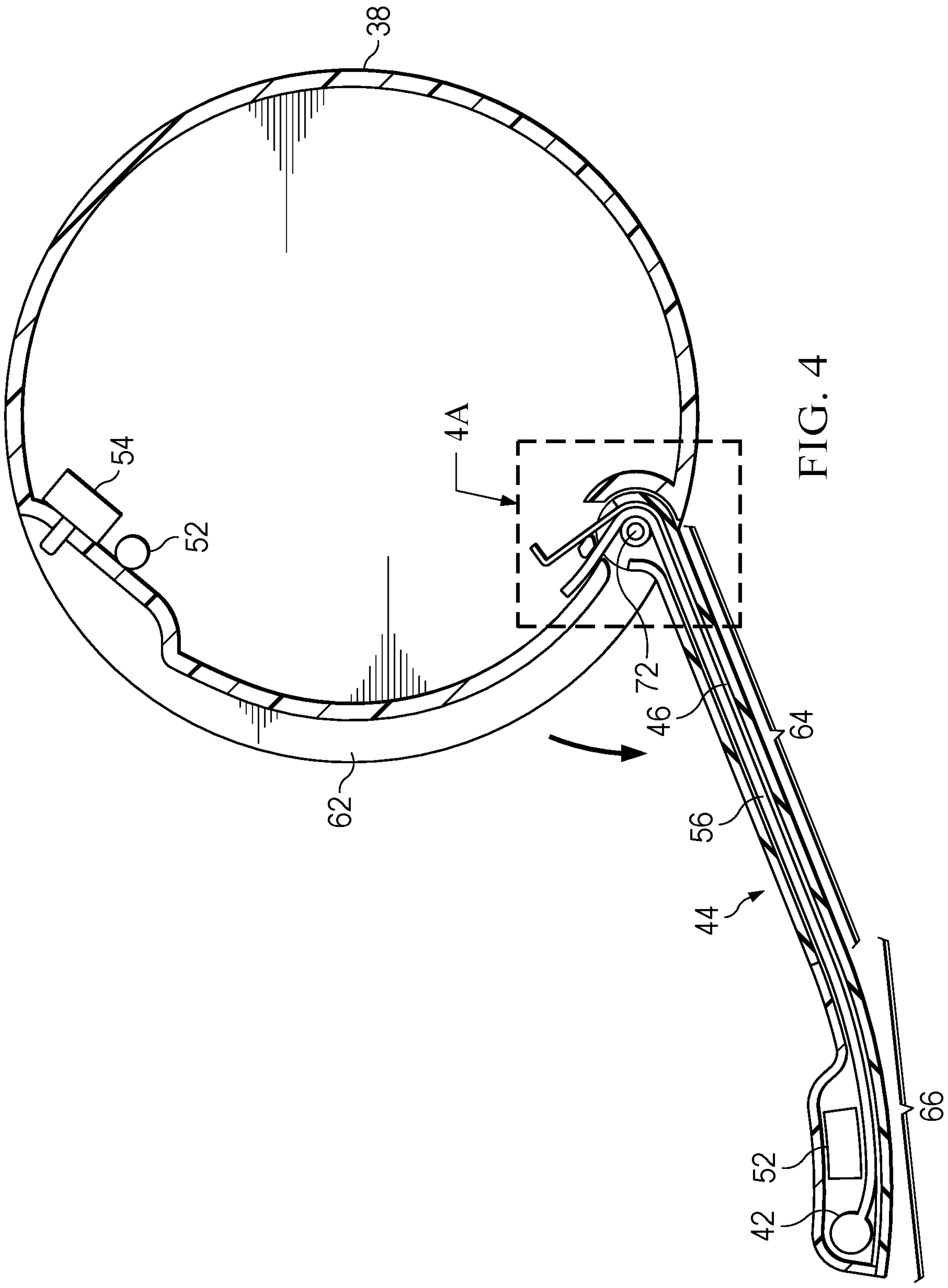
FIGS. 4 and 4A depict a side section view of the headset earcup having the microphone boom in an extended position.
Figure 4A:
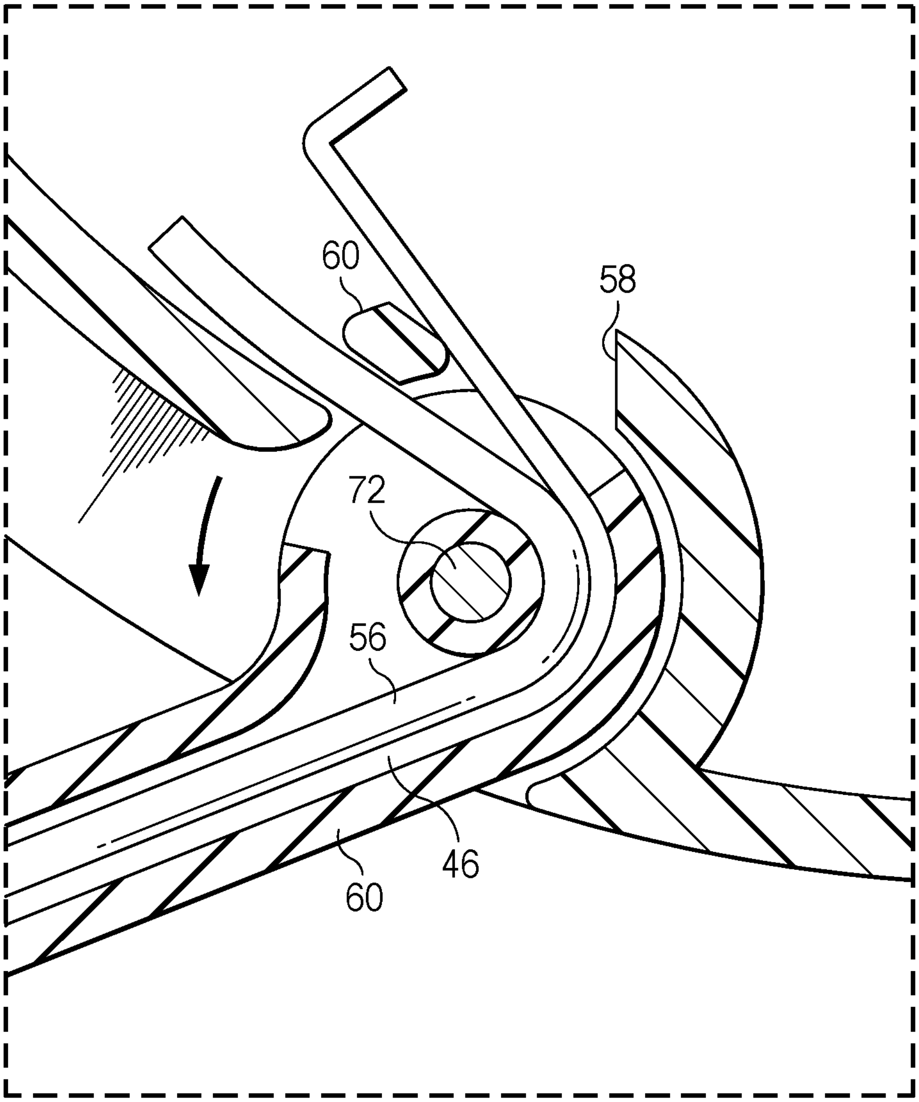

Referring now to FIGS. 4 and 4A, a side section view depicts the headset earcup 38 having the microphone boom 44 in an extended position. A cavity 62 is defined along the periphery of earcup 38 to store microphone boom 44 when retracted. At removal of the magnets 52 from each other, the spring force of member 46 against rearward stop 58 rotates microphone boom 44 out of cavity 62 to the free rotation zone. In the example embodiment, member 46 returns to a straight form so that a straight portion 64 of microphone boom 44 extends microphone 42 away from earcup 38. A curved portion 66 has a slight bend to direct the microphone towards the end user mouth and to leave a partial area outside of cavity 62 when retracted that an end user can grasp to achieve the extended state. FIG. 4A depicts a detailed view of the position of the end of member 44 abutting the forward stop 60 to stop further rotation of microphone boom 44. The free rotation zone is defined by the room between forward stop 60 and rearward stop 58 in that rotation of microphone boom 44 once member 46 works against a stop results in bending of member 46 and a spring retention force back towards the free rotation zone. Rubber casing 60 encloses member 46 and cable 56 to complete the microphone boom assembly.

Figure 5A:
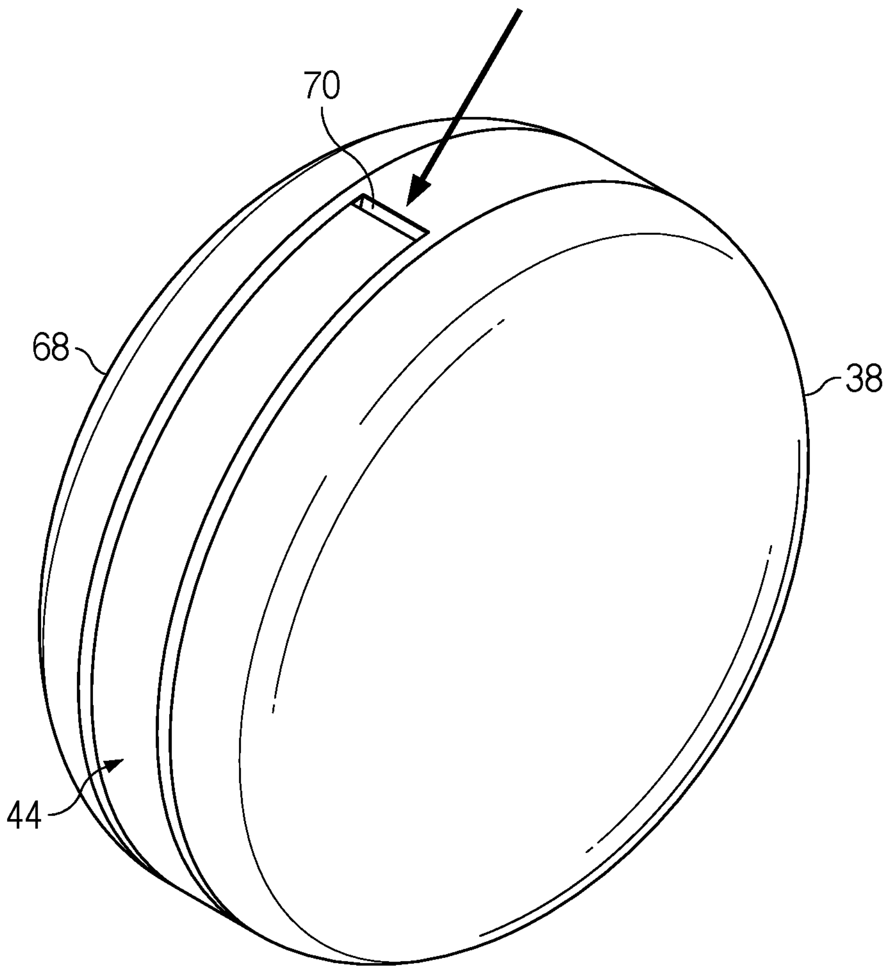
FIGS. 5A and 5B depict side perspective views of an alternative embodiment of the headset having a microphone boom that retracts flush to the earcup.
Figure 5B:
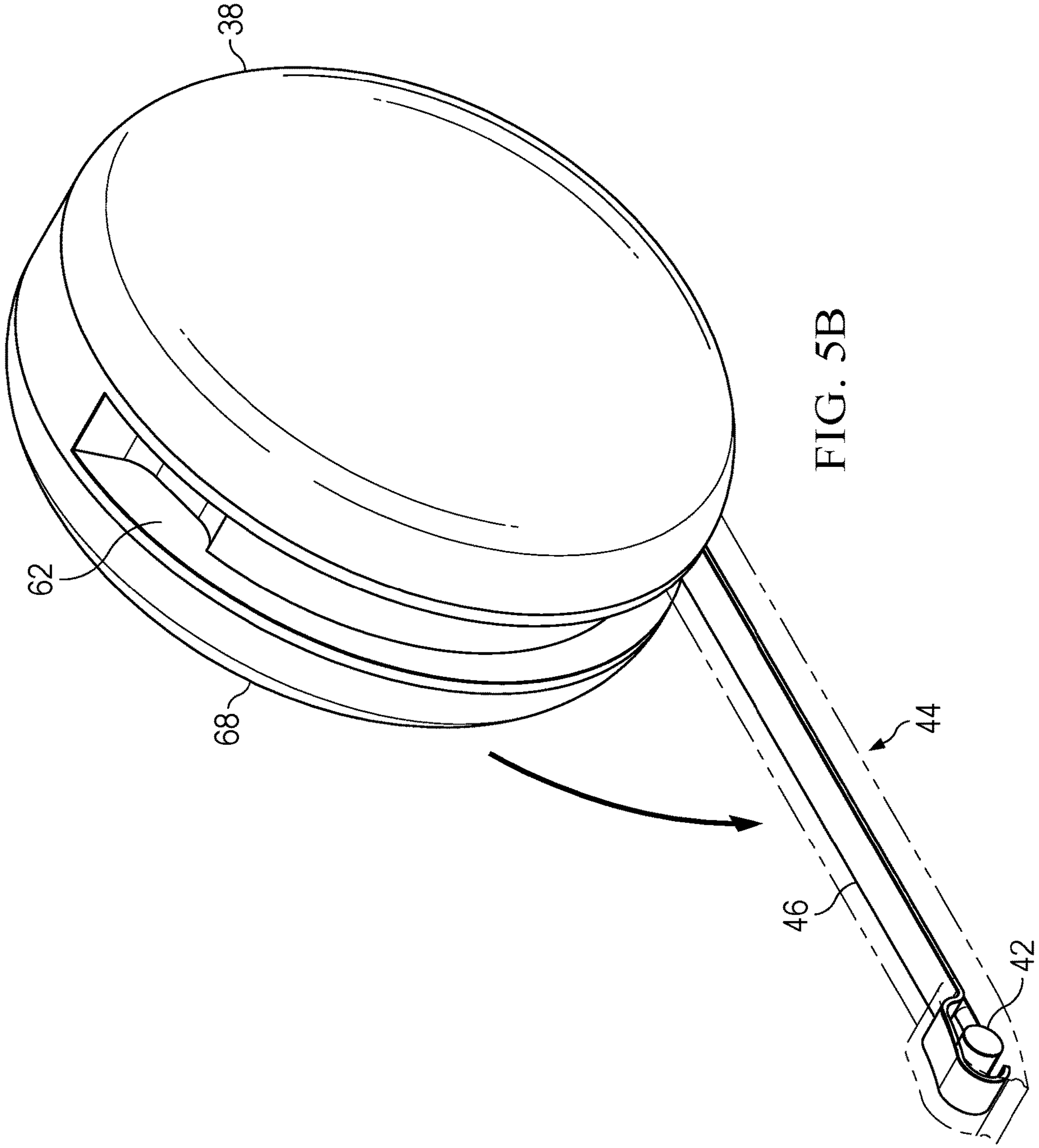

Referring now to FIGS. 5A and 5B, side perspective views depict an alternative embodiment of the headset having a microphone boom that retracts flush to the earcup. FIG. 5A depicts microphone boom 44 in a retracted position leaving a pull area 70 that an end user can access with a fingernail. Microphone boom 44 fits in a cavity of earcup 38 by an earpad 68 to be proximate the end user mouth when rotated to the extended position. FIG. 5B depicts microphone boom 44 extended out of cavity 62 converting from the bent form of FIG. 5A to a straight form that provides a maximal extension of the microphone out and away from earcup 38 for the given member 46 length.

Figure 6:
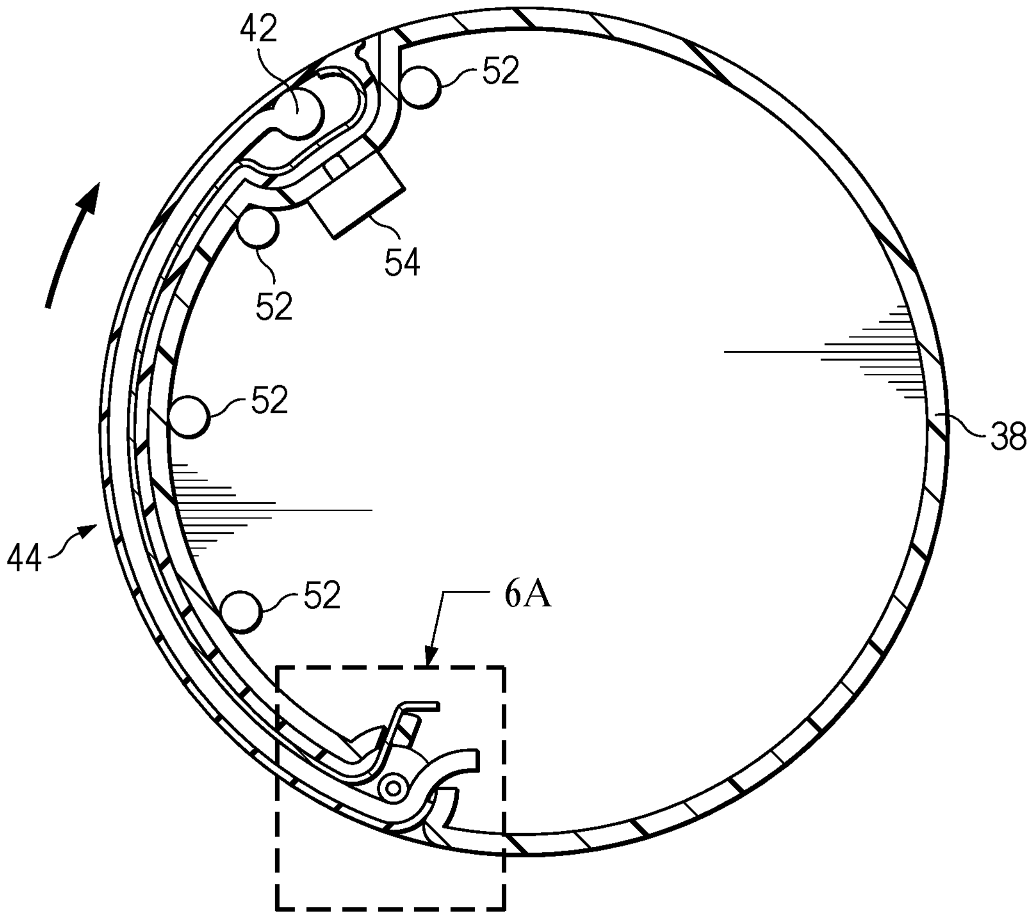
FIGS. 6 and 6A depict a side sectional view of the alternative headset earcup having the microphone boom in a retracted position.
Figure 6A:
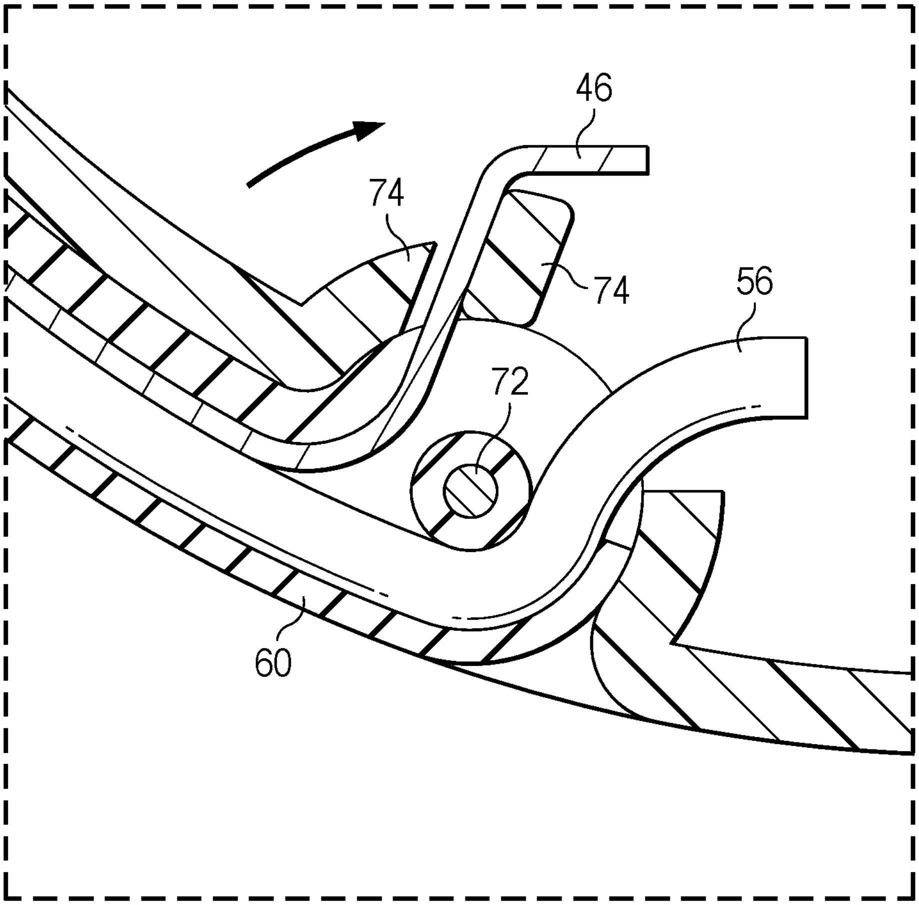

Referring now to FIGS. 6 and 6A, a side sectional view depicts the alternative headset earcup 38 having the microphone boom 44 in a retracted position. Magnet 52 of opposing polarity retain microphone boom 44 in earcup 38 in a flush position at the earcup periphery. Microphone 42 is fully retracted into the cavity and against switch 54 to command a mute. FIG. 6A depicts a more narrow range established by stops 74, which define a channel against which member 46 operates. In the retracted position, member 46 creates a spring bias outward to the extended position that extends microphone boom 44 when the magnetic retention force is released.

Figure 7:
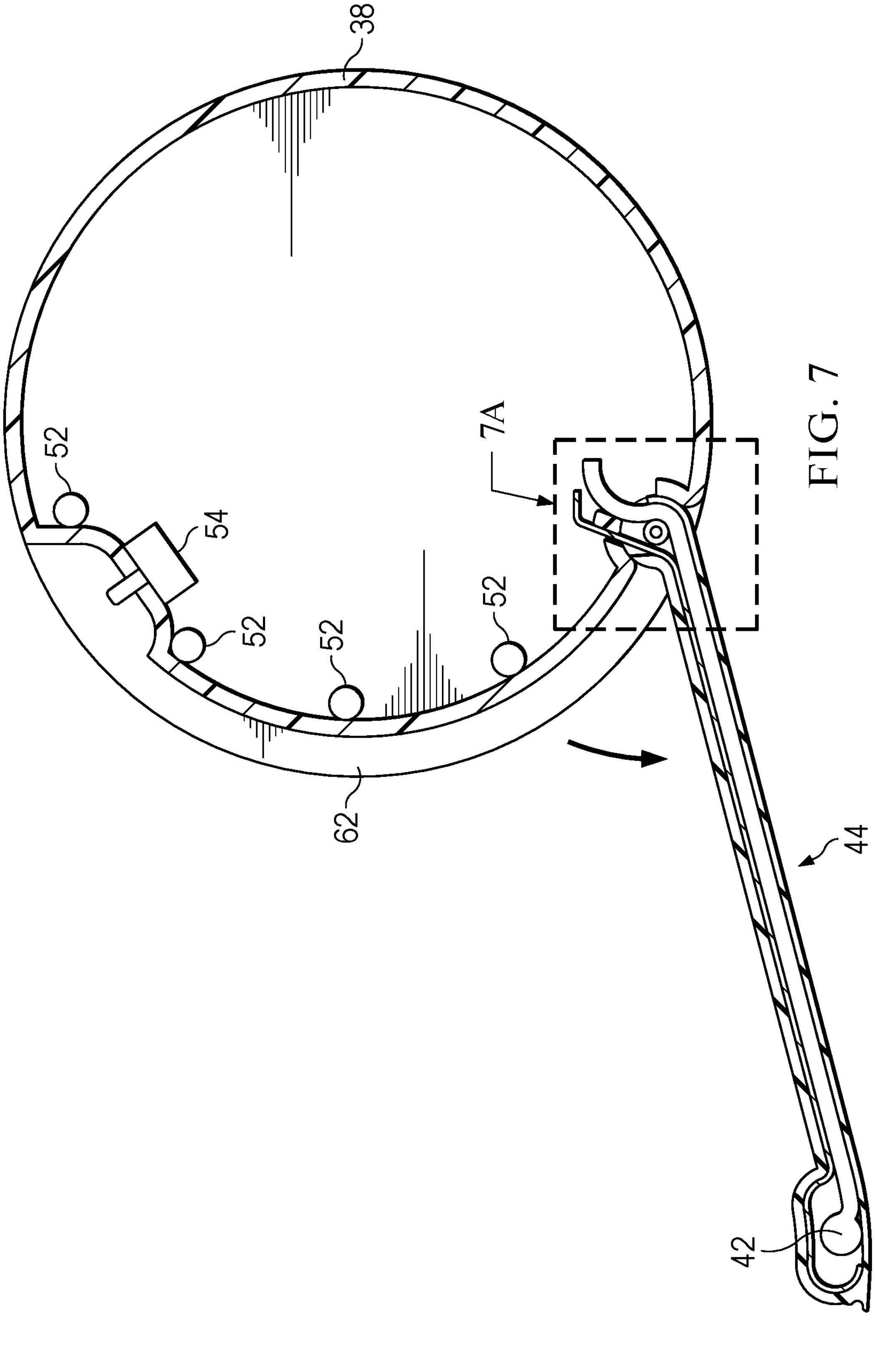
FIGS. 7 and 7A depict a side section view of the alternative headset earcup having the microphone boom in an extended position.
Figure 7A:
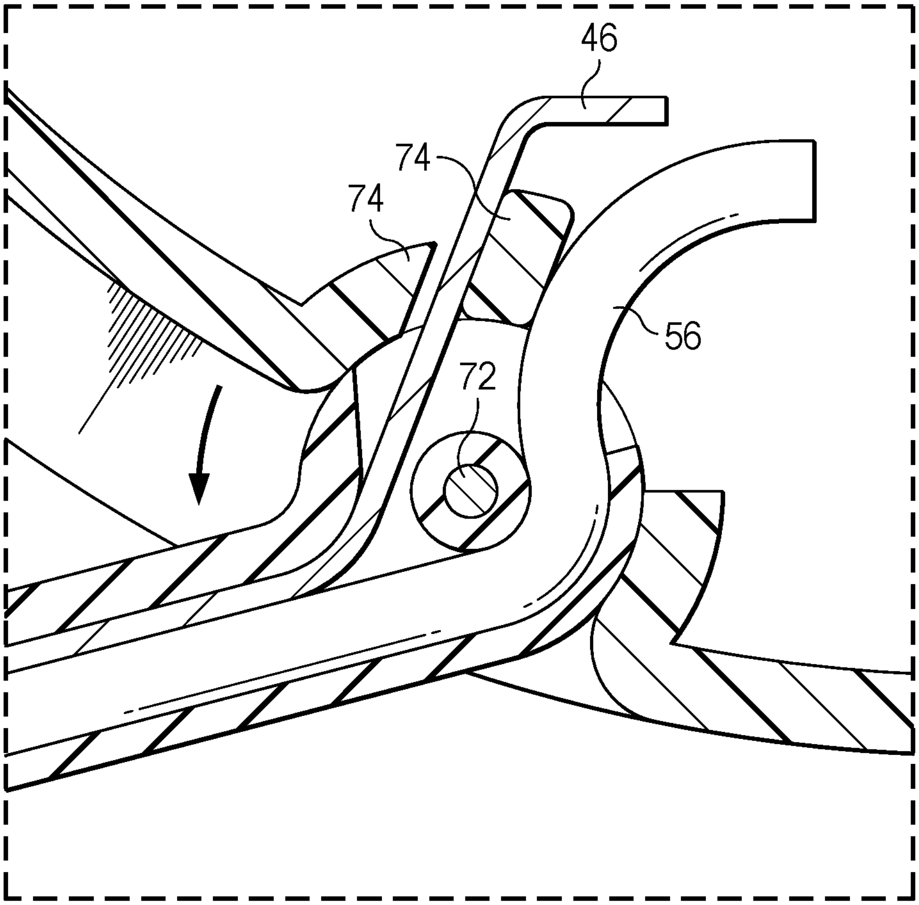

Referring now to FIGS. 7 and 7A, a side sectional view depicts the alternative headset earcup 38 having the microphone boom 44 in an extended position. The switch 54 detects release of the microphone boom 44 to enable microphone 42 once microphone boom 44 springs free from cavity 62 by the resiliency of member 46 caught in the channel between stops 74. Cable 56 communicates audible information signals from microphone 42. The more narrow rotation range defined by the channel between stops 74 reduces the amount of rotation about hinge 72 and sets a better defined position of the extend microphone boom in the straight form as shown. As described above, variations in the size of the channel relative to the location of hinge 72 help to define the bent form of the microphone boom to conform to the earcup outer periphery.

Figure 8:
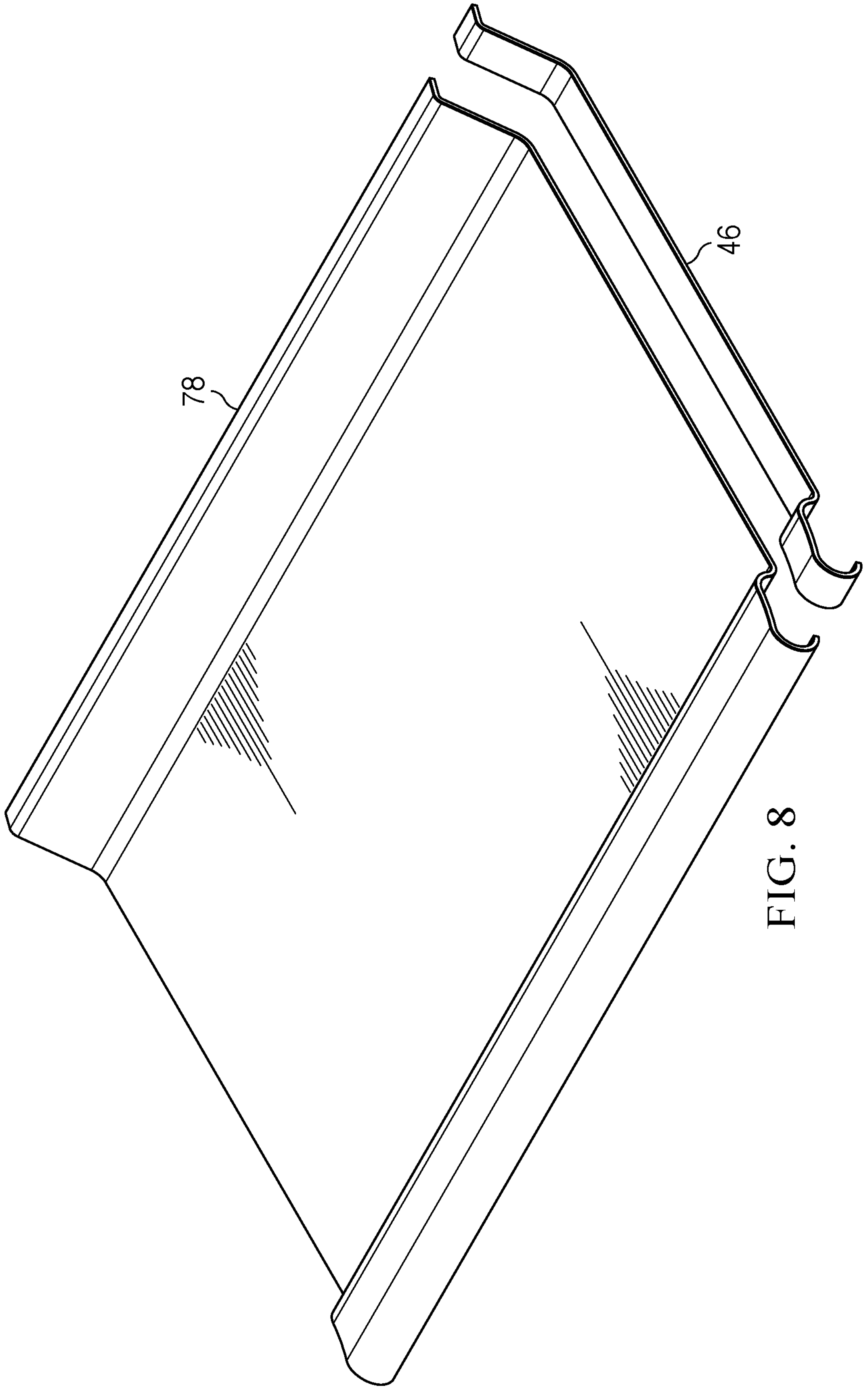
FIGS. 8, 8A and 8B depict examples of manufacture of a microphone boom member that extends and retracts in a headset cavity.
Figure 8A:
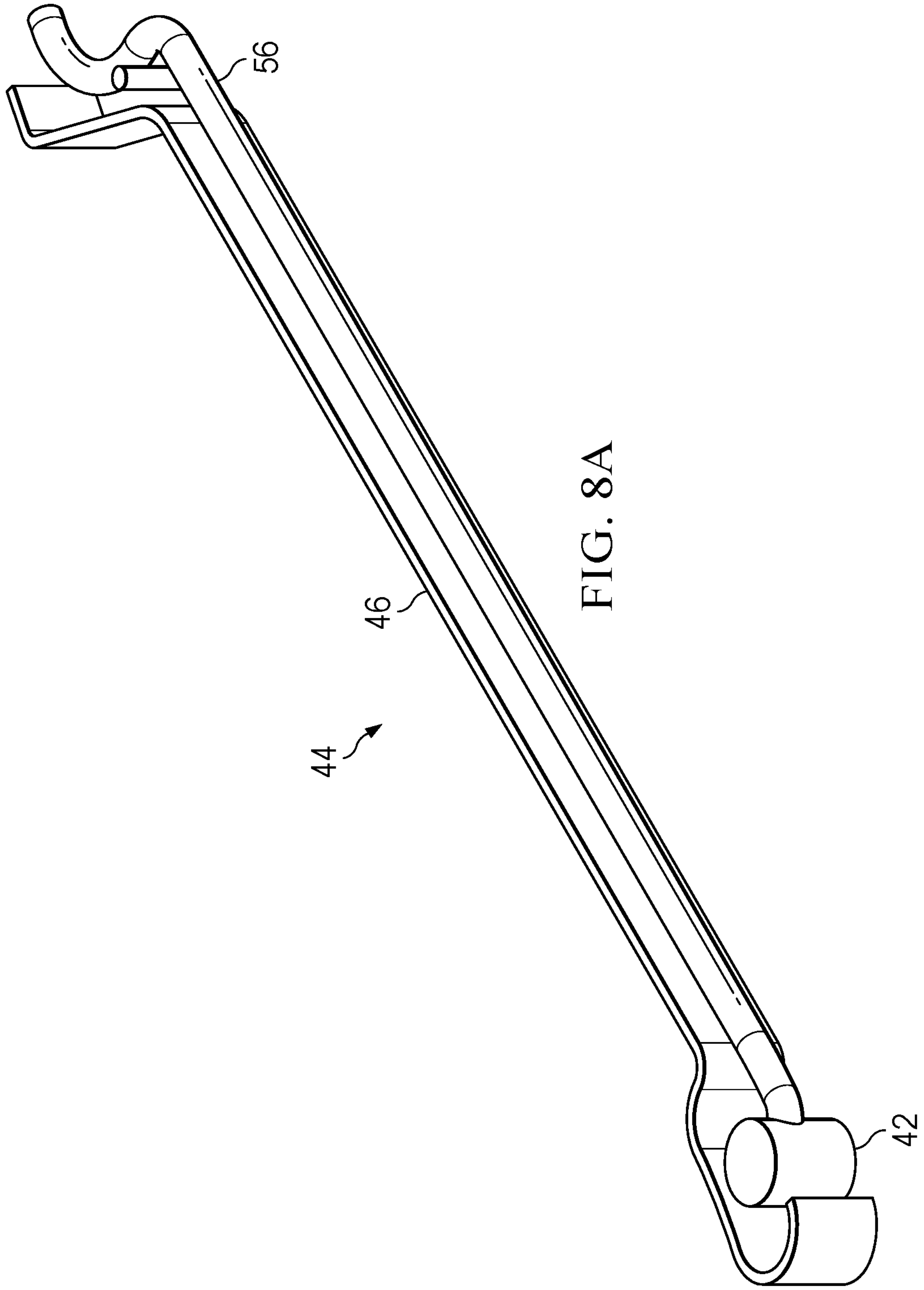
Figure 8B:
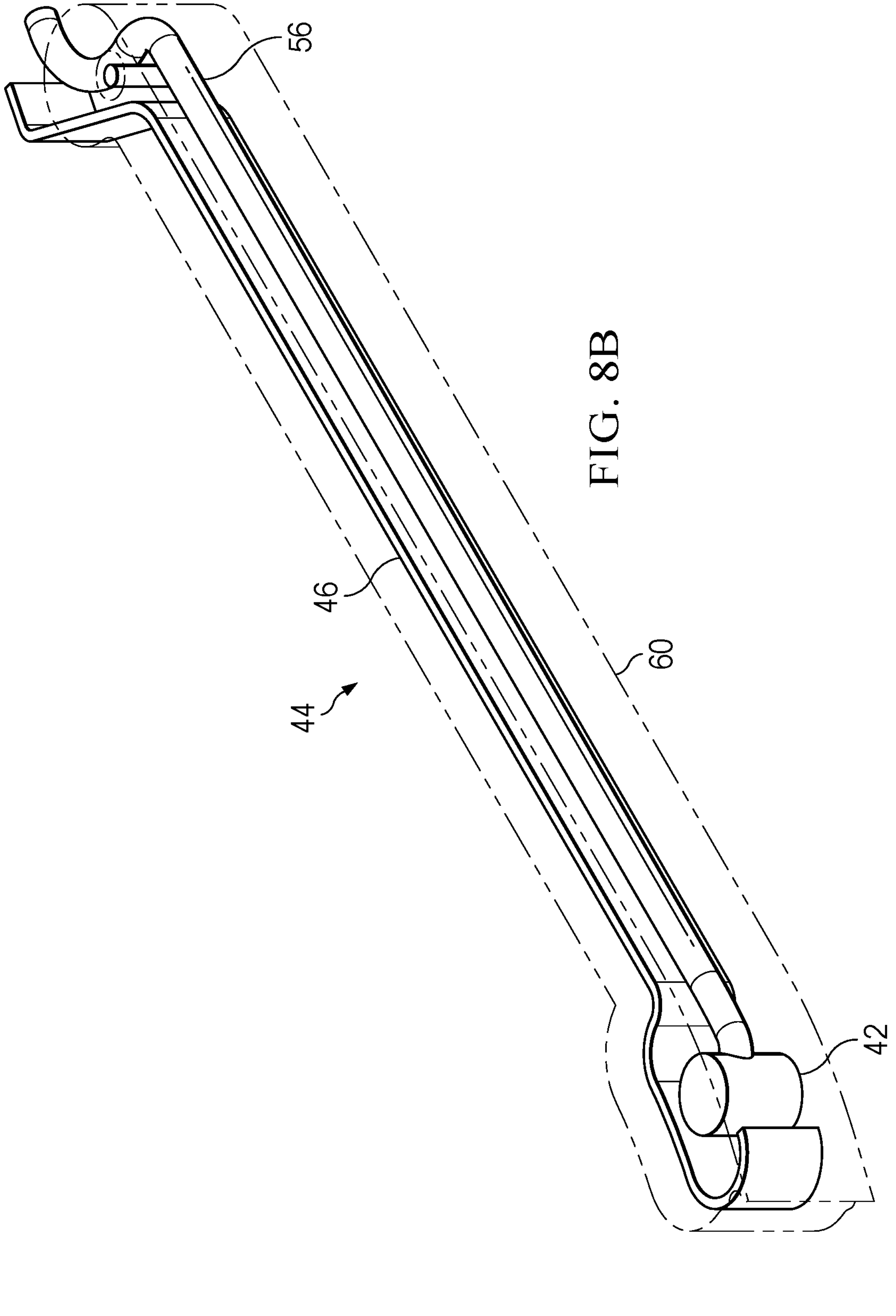

Referring now to FIGS. 8, 8A and 8B examples depict manufacture of a microphone boom member that extends and retracts in a headset cavity. An extruded metallic material 78, such as steel, stainless steel and/or a nickel titanium alloy, is cut to form flexible member 46 with a shape that accepts the microphone. The metallic material may be heat treated before or after a die cut to provide desired resiliency. In FIGS. 8A and 8B, microphone 42 and cable 56 couple to member 46 and then rubber casing 60 encloses the assembly, such as with a low temperature rubber injection molding. In some embodiments, member 46 may include multiple materials, such as a steel cut piece reinforced by a nickel titanium wire.

Although the present invention has been described in detail, it should be understood that various changes, substitutions and alterations can be made hereto without departing from the spirit and scope of the invention as defined by the appended claims.

What is claimed is:

1. An information handling system comprising:

a housing;

a processor disposed in the housing and operable to execute instructions that process information including audio information;

a memory disposed in the housing and interfaced with the process, the memory operable to store the instructions and information; and a headset interfaced with the processor, the headset having a speaker disposed in an earcup to present the audio information as audible sound and a microphone disposed in a boom to capture audible sound as audio information, the boom having a flexible member rotationally coupled by a hinge located at a first end of a cavity of the earcup, the flexible member terminating with the microphone and transitioning from a substantially straight form when extended out of the cavity to a bent form when rotated into the cavity, the bent form conforming with a periphery of the earcup.

2. The information handling system of claim 1 further comprising:

a first stop at a first side of the hinge to stop rotation of the member in a first direction; and a second stop at a second side of the hinge to stop rotation of the member in second direction, the member rotating between the first and second stop to achieve an extended position out of the cavity and a retracted position in the cavity.

3. The information handling system of claim 2 wherein the member comprises cut steel.

4. The information handling system of claim 2 wherein the member comprises nickel titanium alloy.

5. The information handling system of claim 2 wherein the member and microphone rotate to the retracted position having the microphone and member flush with the periphery of the earcup.

6. The information handling system of claim 2 wherein the member and microphone rotate to the retracted position having the microphone and member extending partially out of the periphery of the earcup.

7. The information handling system of claim 2 wherein the member when extended between the first and second stops has a straight form between the hinge and the microphone.

8. The information handling system of claim 2 further comprising:

a first magnet disposed on the member; and a second magnet disposed in the cavity, the first and second magnets having opposing polarity to magnetically couple the member in the cavity in the retracted position.

9. The information handling system of claim 2 further comprising a mute switch disposed in the cavity and aligned to detect when the member is in the retracted position, the mute switch muting the microphone.

10. A method for managing a microphone boom of an audio headset, the method comprising:

coupling a microphone to a flexible member;

rotationally coupling the flexible member to an earcup to rotate between first and second stops;

extending the flexible member in a straight form when rotated to an extended position between the first and second stops; and bending the flexible member to a curved form that conforms to the earcup when rotated against the first stop and to a retracted position within a cavity of the earcup.

11. The method of claim 10 further comprising:

rotating the member to the retracted position having the microphone in the cavity and the member flush along the periphery of the earcup.

12. The method of claim 10 further comprising:

rotating the member to the retracted position having the microphone in the cavity and partially out of the cavity.

13. The method of claim 12 further comprising:

detecting the retracted position with a switch disposed in the cavity; and in response to the detecting, muting the microphone.

14. The method of claim 12 further comprising:

forming the member with a die cut from an extruded steel plate; and heat treating the member to a predetermined resiliency.

15. The method of claim 12 further comprising:

forming the member to have a straight portion that bends in the retracted position; and forming the member to have a curved portion that couples with the microphone.

16. The method of claim 12 further comprising:

forming the member at least in part with a nickel titanium alloy.

17. A headset comprising:

an earcup having a cavity;

a speaker disposed in the earcup and operable to present audio information as audible sound;

a microphone operable to capture audible sounds as audio information;

a boom rotationally coupled to the earcup, the boom having a flexible member rotationally coupled by a hinge located at a first end of the cavity, the flexible member terminating with the microphone and transitioning from a substantially straight form when extended out of the cavity to a bent form when rotated into the cavity, the bent form conforming with a periphery of the earcup.

18. The headset of claim 17 further comprising:

a first stop at a first side of the hinge to stop rotation of the member in a first direction; and a second stop at a second side of the hinge to stop rotation of the member in second direction, the member rotating between the first and second stop to achieve an extended position out of the cavity and a retracted position in the cavity.

19. The headset of claim 18 wherein the member and microphone rotate to the retracted position having the microphone and member flush with the periphery of the earcup.

20. The headset of claim 18 wherein the member and microphone rotate to the retracted position having the microphone and member extending partially out of the periphery of the earcup.

* * * * *